US005617547A

United States Patent [19]
Feeney et al.

[11] Patent Number: 5,617,547
[45] Date of Patent: Apr. 1, 1997

[54] SWITCH NETWORK EXTENSION OF BUS ARCHITECTURE

[75] Inventors: James W. Feeney, Endicott; John D. Jabusch, Endwell; Robert F. Lusch, Vestal; Howard T. Olnowich; George W. Wilhelm, Jr., both of Endwell, all of N.Y.

[73] Assignee: International Business Machines Corporation, Armonk, N.Y.

[21] Appl. No.: 640,368

[22] Filed: Apr. 30, 1996

Related U.S. Application Data

[63] Continuation of Ser. No. 144,849, Oct. 28, 1993, abandoned, and a continuation-in-part of Ser. No. 946,204, Sep. 17, 1992, Pat. No. 5,495,474, and a continuation-in-part of Ser. No. 946,512, Sep. 17, 1992, abandoned, and a continuation-in-part of Ser. No. 947,644, Sep. 17, 1992, abandoned, and a continuation-in-part of Ser. No. 946,506, Sep. 17, 1992, abandoned, which is a continuation-in-part of Ser. No. 677,543, Mar. 29, 1991, abandoned.

[51] Int. Cl.⁶ .................................................. G06F 13/00
[52] U.S. Cl. ...................................... 395/311; 370/419
[58] Field of Search ..................................... 395/311, 312; 370/60, 26

[56] References Cited

U.S. PATENT DOCUMENTS

| | | | |
|---|---|---|---|
| 4,787,025 | 11/1988 | Cheselka et al. | 395/250 |
| 4,933,846 | 6/1990 | Humphrey et al. | 395/200 |
| 5,006,981 | 4/1991 | Beltz et al. | 395/325 |
| 5,083,259 | 1/1992 | Maresh et al. | 395/325 |
| 5,088,028 | 2/1992 | Theus et al. | 395/325 |
| 5,123,092 | 6/1992 | Buxton et al. | 395/250 |
| 5,133,053 | 7/1992 | Johnson et al. | 395/200 |
| 5,136,584 | 8/1992 | Hedlund | 370/94.1 |
| 5,138,703 | 8/1992 | Igarashi | 395/325 |
| 5,140,583 | 8/1992 | May et al. | 370/60 |
| 5,140,585 | 8/1992 | Tomikawa | 370/60.1 |
| 5,175,824 | 12/1992 | Soderbery et al. | 395/325 |
| 5,179,669 | 1/1993 | Peters | 395/312 |
| 5,189,666 | 2/1993 | Kagawa | 370/60 |
| 5,204,858 | 4/1993 | Kinashi et al. | 370/94.1 |
| 5,253,251 | 10/1993 | Aramaki | 370/60 |
| 5,355,364 | 10/1994 | Abali | 370/54 |
| 5,379,280 | 1/1995 | Cotton et al. | 370/62 |
| 5,390,173 | 2/1995 | Spinney et al. | 370/60 |
| 5,404,461 | 4/1995 | Olnowich et al. | 395/325 |
| 5,423,006 | 6/1995 | Brown et al. | 395/275 |
| 5,430,728 | 7/1995 | Narayanan et al. | 370/85.13 |

FOREIGN PATENT DOCUMENTS

| | | |
|---|---|---|
| 0356110 | 2/1990 | European Pat. Off. . |
| 0439693 | 8/1991 | European Pat. Off. . |
| 0489583 | 6/1992 | European Pat. Off. . |

*Primary Examiner*—Ayaz R. Sheikh
*Attorney, Agent, or Firm*—Gene Shkurko; Shelley M. Beckstrand

[57] ABSTRACT

An electronic switching and data transmission system for interconnecting a plurality of buses. A switching network interconnects several multi-drop buses using adapters to connect the buses to the switching network. The adapters implements hardware functions to appear to software as if all devices on the several buses were attached to a single large bus. The system permits higher speed transfer modes by eliminating multi-drop bus limitations.

14 Claims, 13 Drawing Sheets

SWITCH NETWORK EXTENSION OF BUS ARCHITECTURE

The application is a continuation of application Ser. No. 08/144,849 filed Oct. 28, 1993, now abandoned which is a continuation-in-part application of the following applications:

U.S. Ser. No. 07/677,543, filed Mar. 29, 1991, entitled "Allnode Switch—An Unclocked, Unbuffered, Asynchronous, Switching Apparatus", by Franaszek et al now abandoned.

U.S. Ser. No. 07/946,204, filed Sep. 17, 1992, entitled "Switch-Based Microchannel Planar Apparatus", by Olnowich et al which is now U.S. Pat. No. 5,495,474.

U.S. Ser. No. 07/946,512, filed Sep. 17, 1992, entitled "Switch-Based Personal Computer Interconnection Apparatus", by Olnowich et al now abandoned.

U.S. Ser. No. 07/947,644, filed Sep. 17, 1992, entitled "Slave Microchannel Converter Apparatus for Converting to Switch Architecture", by Olnowich et al now abandoned.

U.S. Ser. No. 07/946,506, filed Sep. 17, 1992, entitled "Master Microchannel Apparatus for Converting to Switch Architecture", by Olnowich et al now abandoned.

The descriptions set forth in these previous applications are hereby incorporated by reference. These applications and the present application are owned by one and the same assignee, International Business Machines Corporation of Armonk, New York.

BACKGROUND OF THE INVENTION

1. Technical Field

This invention relates to new and useful improvements in data processing systems. More specifically, it relates to an apparatus for extending a bus architecture to allow many individual workstation or PC systems to perform high-speed communications in parallel while maintaining bus addresses constant and making the expansion transparent to software.

2. Description of the Prior Art

The problem exists in PC's and workstations that there is an ever increasing need for better I/O bus performance and the attachment of more I/O options. This is in direct conflict with the nature of a multi-drop bus technology, which loses performance as more I/O options are added as taps to the bus. In general, standard bus architectures such as the microchannel bus (MC) have selected a performance goal and have backward engineered the number of I/O taps permissible at that performance level. In the case of the microchannel bus the result is that 8 taps (expansion cards) is the maximum number of allowable bus taps to permit bus operations to occur at 200 ns cycle times. As a result MC users are beginning to find that the I/O capability is not sufficient to meet their needs. For years people having been looking for means of increasing the I/O capability of PC busses, and still require a good solution.

Some machines have been packaged with separate microchannel buses in one cabinet to increase the number of expansion cards in one system. The disclosed solution is much more flexible in that it allows unlimited expansion. Also, the disclosed solution permits any tap to transfer data to any other tap, while the previous systems allow only limited combinations.

U.S. Pat. No. 5,088,028 discloses an bus-to-bus interface circuit for communicating data between two computer systems. The interface circuit permits the first bus (VMEbus) to gain control of the second bus (Futurebus) to prevent another bus from gaining access to it.

U.S. Pat. No. 5,083,259 discloses an interconnection device For attaching an AT computer to a VMEbus and allowing the AT computer to access the bus in real mode.

U.S. Pat. No. 5,006,981 discloses a system for coupling multimaster capable buses. The system includes an expansion module for each bus for receiving and sending addresses, data, commands and status signals.

U.S. Pat. No. 5,123,092 discloses a bus interface for connecting a computer's internal bus to an expansion bus. The interface is capable of selecting or deselecting any other device connected to the expansion bus.

U.S. Pat. No. 5,138,703 discloses a method and apparatus for expanding a system bus, providing a capability of transferring a data word from a unit connected to a system bus to a unit connected to an extension bus.

SUMMARY OF THE INVENTION

This invention comprises an apparatus and system for interconnecting a number of buses having computer system devices attached thereto. An electronic switch network having a plurality of input and output ports communicates via network adapters to the various buses. The adapters are connected to a port and include addressing means for transmitting data between the switch network and the buses. The adapters are further capable of communicating with the switch network in a way that maintains the bus addresses consistent across the network. This feature makes the system appear to the devices attached to the number of buses as if they were connected to a single large bus between all the attached devices.

The solution disclosed herein provides a means for extending a limited bus architecture to thousands of I/O device taps by using electronic switches to interconnect multiple busses. A prime example of this is the extension of the IBM MicroChannel Bus Architecture. The microchannel can be extended to various "Microchannel Islands" (MI), where each MI is a unique microchannel bus (MC) that can be composed of 1 to 8 multi-drop bus taps. In other words, the new extended microchannel bus becomes a maze of a few or many MC multi-drop busses (MI's) interconnected to each other by a switching network as shown in FIG. 1. An adapter (hereafter also referred to as MC converter 130-13n) is used to connect each MI to the switch network, and the adapter implements the disclosed hardware functions required to keep MC bus addresses consistent across the entire system and to make the entire system appear to the software as if all devices on all MI's were attached to a single large microchannel bus and can service an unlimited number of devices.

In addition, with the MI concept it is possible to implement new and higher speed MC transfer modes in special cases. In cases where the multi-drop aspect of the MC limits transfer speed, it is possible to eliminate the multi-drop nature of the MC by assigning one and only one tap to each MI. In this way, every MI becomes a point-to-point MC bus which provides only one tap into the new extended MC created by the switch network. The switching portion of the system becomes larger and the multi-drop portion becomes smaller or non-existent, but the over-all single system image doesn't change nor the large number of MC taps that can be supported. Every switch connection is also a point-to-point connection, making it possible, if desired, to build the entire system from all point-to-point connections. This enables faster MC transfers to be defined, since it would no longer be necessary to slow down MC transfers because of multi-drop bus limitations.

Instead of using the MC as a point-to-point bus, it is possible to just eliminate the MC and let each I/O tap be a direct connection to the switch network, thus eliminating the adapter and even further improving speed, as well as mixing and matching different taps where some are MI's and some are direct switch network connections. However, it is very important to initially maintain compatibility with the MC, because of the large availability of various MC expansion cards. By maintaining MC compatibility and using the MI concept, it becomes possible to create large systems (including parallel processors) with a very minimal amount of new investment by simply leveraging off of existing MC expansion cards, reusing the present investment, and allowing further expansion to occur without affecting existing software.

Other features and advantages of this invention will become apparent from the following detailed description of the presently preferred embodiment of the invention, taken in conjunction with the accompanying drawings.

DESCRIPTION OF THE PREFERRED EMBODIMENT

The Switch Network

Figure 1:
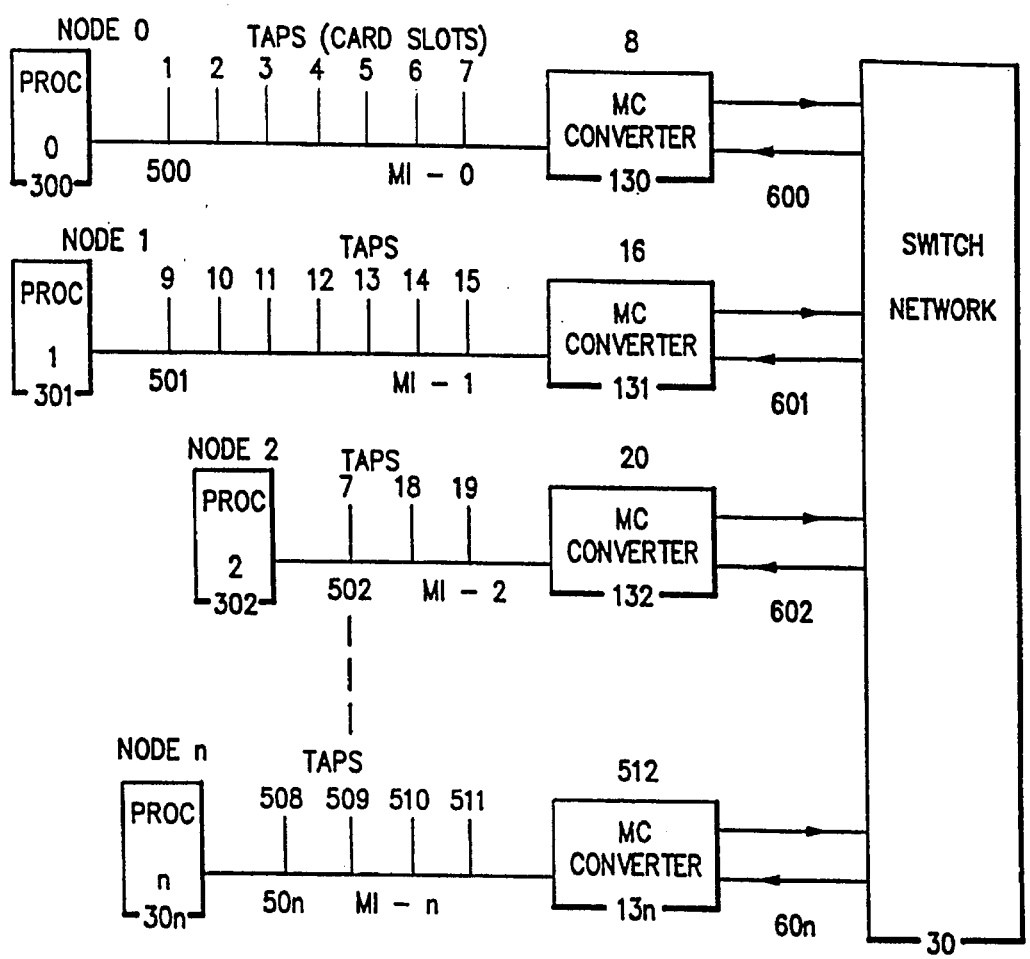
FIG. 1 illustrates generally the concept of multiple MicroChannel Islands which are multi-drop bus based connections, themselves being interconnected via a multi-stage switching network.

Turning now to the drawings in greater detail, FIG. 1 shows the preferred method of interconnecting n PCs and/or workstations as nodes of a parallel system via the multi-stage switch network 30. The entire system is composed of n individual nodes, where each node is comprised of a PC and/or workstation consisting of a processor with its associated MicroChannel I/O bus. Node 0 is comprised of processor 300 and MC Bus 500, Node 1 is comprised of processor 301 and MC Bus 501, Node 2 is comprised of processor 302 and MC Bus 502, and Node n is comprised of processor 30n and MC Bus 50n, where n is theoretically an unbounded positive integer. Each MC Bus 500 to 50n is connected to an individual MicroChannel Converter unit (MCC), with MC bus 500 connecting to MCC 130, MC bus 501 connecting to MCC 131, MC bus 502 connecting to MCC 132, and MC bus 50n connecting to MCC 13n. These individual MC Busses are referred to as MicroChannel Islands, which are separate busses interconnected by a sea of switch network. Each MCC 130 to 13n has second and third interfaces which connect to an input and output port, respectively, of unidirectional switch network 30.

A typical node is shown to consist of a variable number of card slots in the form of taps to/from the MC Bus, with the number of taps being individually selectable at each node and usually being between 1 to 8 taps per MC Bus, depending upon the PC or workstation model being used. The MCC 130 to 13n blocks represent MC expansion cards that require the usage of one of the cards slots on each MC Bus 500 to 50n. The remaining cards slots in each MC Bus 500 to 50n can be populated by any combination of standard MC expansion cards or left unoccupied.

The MCC 130 to 13n cards serves a bridge from the MC to the switch network having both MC and switch interfaces, and the MCC blocks implement the hardware which enables the MC and switch interfaces to work together to transfer data messages to and from the associated node to other nodes connected to switch network 30. The primary function of each MCC 130–13n unit is to convert node address or memory addresses or I/O addresses presented by the initiating MicroChannel into a means of locating the exact MI, where the addressed processor, memory location, or I/O device resides. The MCC block then controls the transferral of data to the selected processor, memory location, or I/O device. The MCC also responds to any network transfers sent to it, and relays the transfer through the MC Bus to the proper destination—processor, memory location, or I/O device. At the destination, the adapter receives a transfer from the switch network and can either interrupt the proper destination tap on the destination MI, or arbitrate for the local MI and send the transfer directly to the addressed tap.

A typical data transfer from one node to another, for instance—node 0 to node 2, would include the following steps. The sending node 0 would communicate to its local microchannel bus, or sending node bus, 500 using standard microchannel bus sequences. MCC 130 would respond to these sequences and convert (that is, derive from) them to sequences and protocols which are understood by switch network 30 as communicated over interface 600. Thus, the communication from node 0 is passed over MC bus 500 to MCC 130, which converts the communication format and passes it on to the switch network 30 over interface 600. Switch network 30 is commanded by MCC 130 to form a connection to the receiving node 2, causing network 30 to pass the communication data through switch network 30 onto switch interface 602. The data is then received by MCC 132, converted back into a standard MC format, and passed over MicroChannel bus 502 to receiving node 2.

Interfaces 600 to 60n to and from switch network 30 provide an expansion interface for every PC or workstation, whereby it can communicate to processors, memory locations, and I/O devices which no longer need be resident on its own MicroChannel Island, but can be located anywhere within the interconnection range of switch network 30. There are two possible implementations of the MicroChannel Converter (MCC) units—either master or slave. The functional details of these MicroChannel Converter units are detailed in the aforementioned parent applications U.S. Ser. No. 07/946,506 and U.S. Ser. No. 07/947,644.

Figure 2:
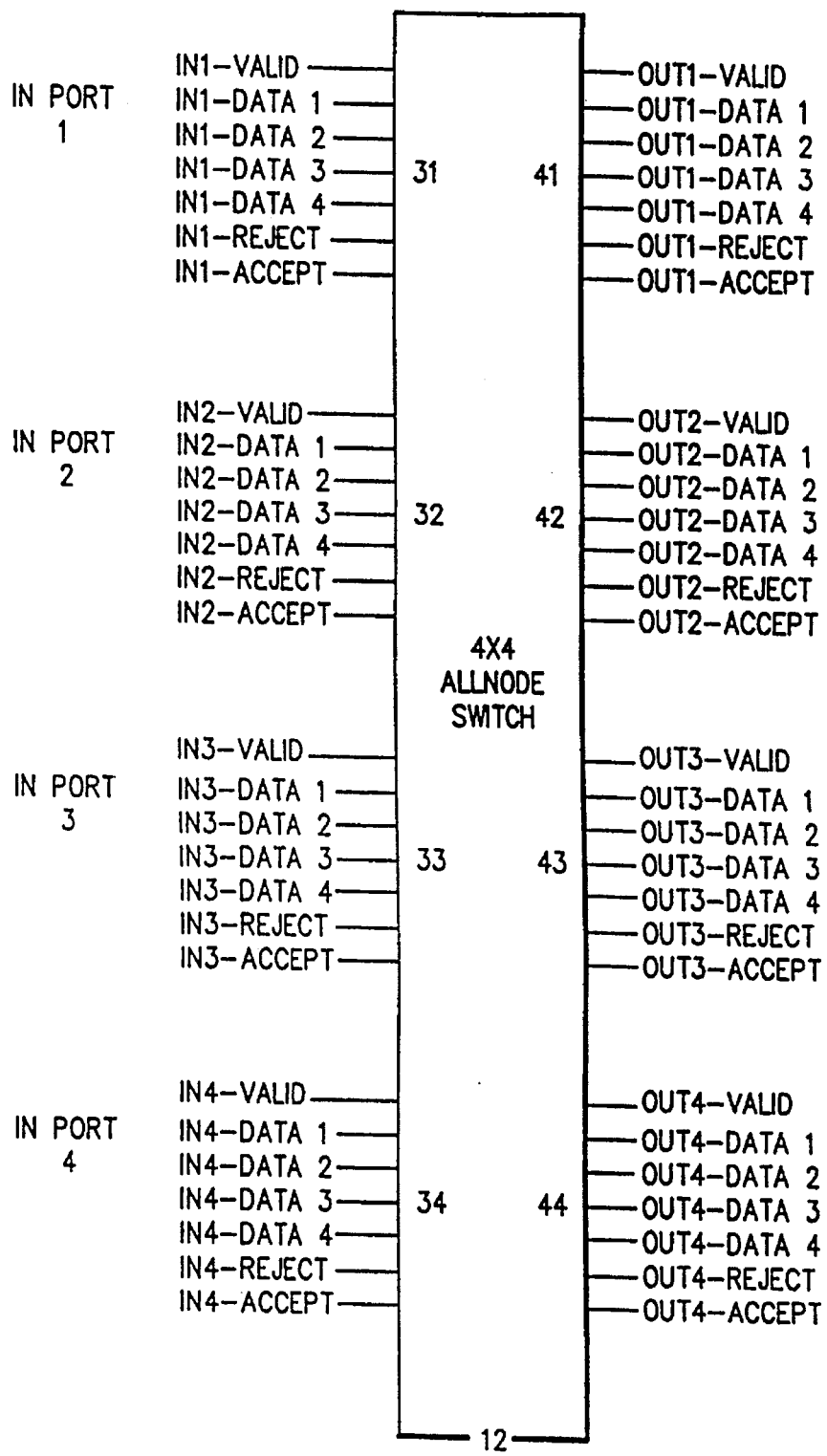
FIG. 2 illustrates a four input and four output (4×4) crossbar switching apparatus, which has the capability of providing the disclosed fully parallel switching means for interconnecting up to four nodes.

FIGS. 2 to 8 refer to a 4×4 crossbar implementation of the switching network to illustrate the principles and speed of the switching concept. Referring to FIG. 2, the preferred embodiment is a 4×4 switching apparatus 12, where the function of the present invention is to provide a means of connecting any of 4 sets of digital, analog, or optical inputs on a mutually exclusive basis to any one of the unused 4 output ports. The 4×4 switching apparatus 12 can support up to 4 simultaneous connections at any given time. For instance, Input 1 could be connected to Output 3, Input 2 to Output 4, Input 3 to Output 2, and Input 4 to Output 1.

The invention switching apparatus 12 is unidirectional, which means that data flows in only one direction across the said switching apparatus 12, that being from input to output. Switching apparatus 12 interfaces are defined in detail in FIG. 2. The set of lines 31, 32, 33, and 34 at each in-port to the switching apparatus 12 are identical in number and function to the set of lines 41, 42, 43, and 44 at each out-port. The sets of interface lines to each input and output port contain seven unique signals: 4 digital data lines, and 3 digital control lines (VALID, REJECT, and ACCEPT). The signals at each port are differentiated by a prefix of INX- or OUTX- indicating the direction and number of the port (X) that they are associated with. The four digital data and one VALID lines have a signal flow in the direction going from input to output across switching apparatus 12, while the digital REJECT and ACCEPT control lines have a signal flow in the opposite direction.

Each unidirectional switch interface set requires only 7 signals, as shown in FIG. 2, to transmit control and data through the network 30—the digital data and control transfer width is ½ byte (4 bits) at a time. The signals required are:

DATA: 4 parallel signals used to command switch connections and transmit digital data messages or digital control headers.

VALID: When active, indicates that a digital message, control header, or analog waveform is in the process of being transmitted. When inactive, indicates a RESET command and causes all switches to reset to the IDLE state.

REJECT: Signal flow is in the opposite direction from the DATA and VALID signals. When active, it indicates that a REJECT or error condition has been detected.

ACCEPT: Signal flow is in the same direction as the REJECT signal.

When in the low state, it indicates that a message is in the process of being received and checked for accuracy. When active, it indicates the message has been received correctly.

Figure 3:
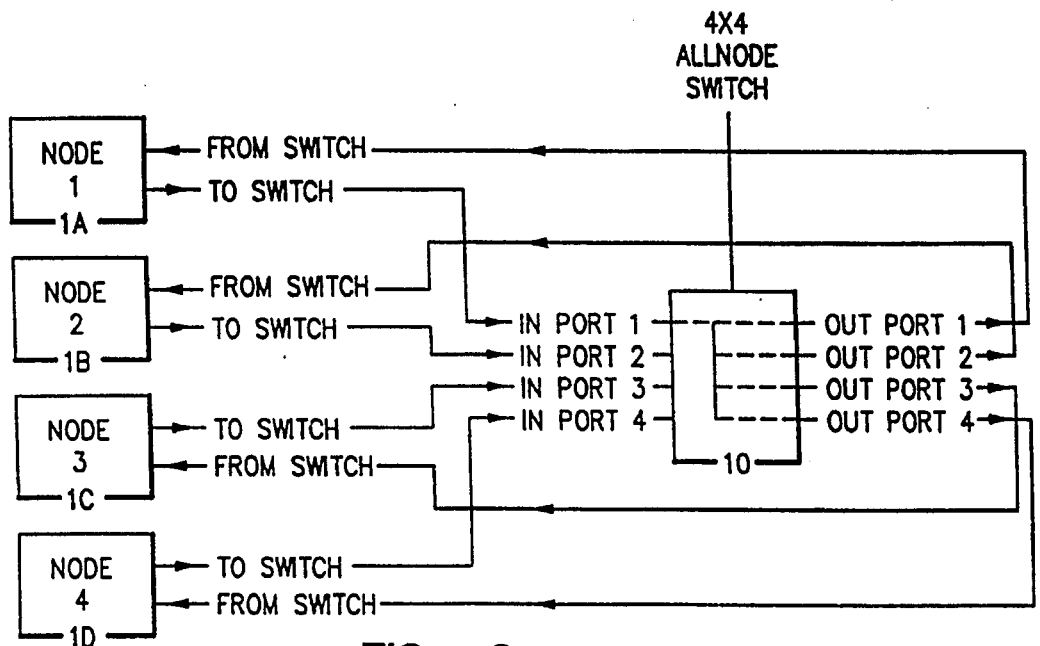
FIG. 3 illustrates the interconnections required to a four input and four output (4×4) crossbar switching apparatus to provide full interconnection amongst four nodes.

FIG. 3 shows the 4×4 crossbar switching apparatus, where the switching apparatus 10 is unidirectional, which means that data flows in only one direction across the said switching apparatus 10, that being from input to output. Although the said switch apparatus 10 is unidirectional, it supports bidirectional communication amongst four nodes by connecting the 4×4 switching apparatus 10 as shown in FIG. 3. Each node has two sets of unidirectional interconnecting wires, one going to the switch 10 and one coming from the switch 10. The dashed lines internal to the switching apparatus 10 indicate that the function of the said switching apparatus is to connect an input port such as INPUT PORT 1 to one of four possible output ports. The switching apparatus 10 provides exactly the same function for each input port, allowing it to be connected to any unused output port.

Figure 4:
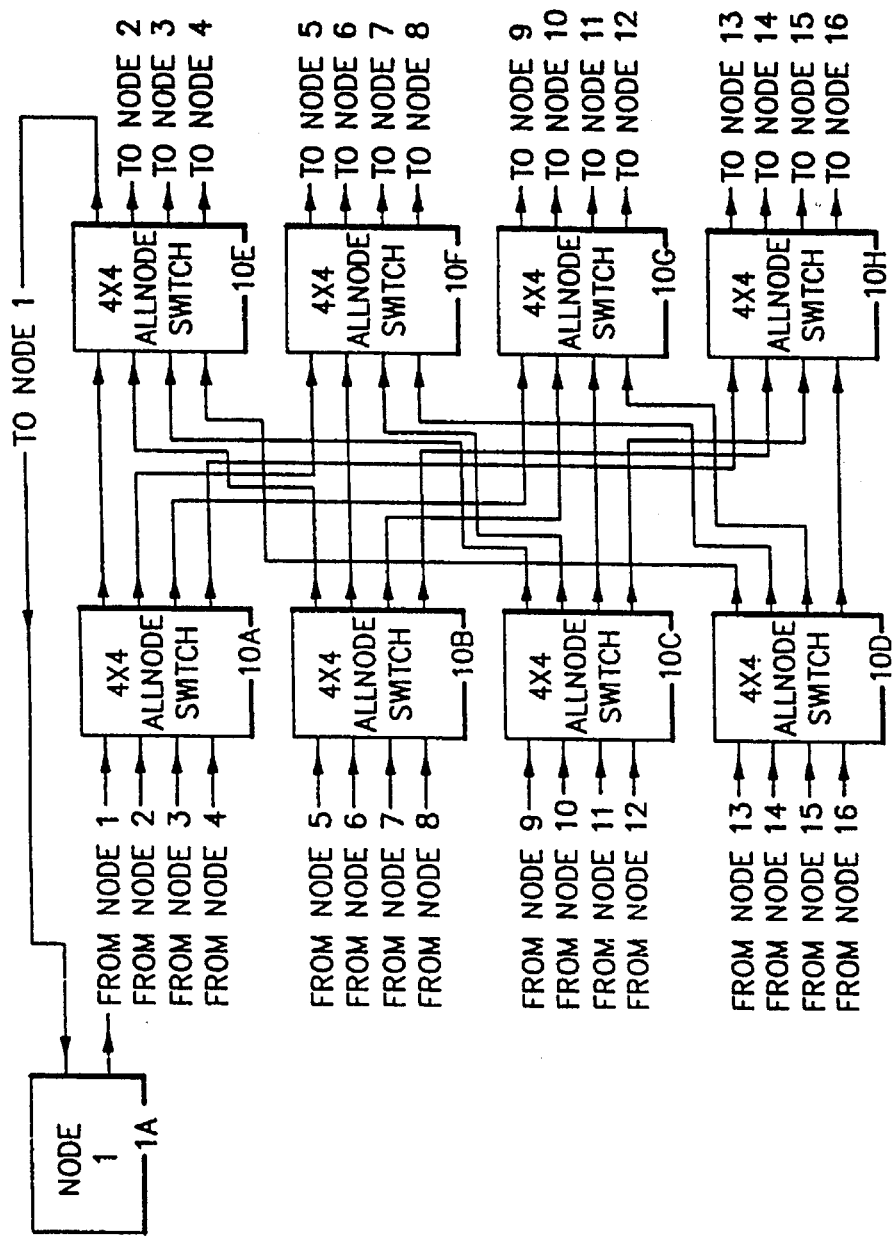
FIG. 4 shows a typical method for cascading the 4×4 disclosed embodiment of the invention switching apparatus to accommodate systems having more than 4 nodes.

Referring to FIG. 4, a method is illustrated for modularly increasing the number of nodes in a system by cascading eight switching apparatus 10 blocks. The eight cascaded switches are denoted as 10A through 10H to indicate that they are identical copies of switching apparatus 10, varying only in regards to the wiring of their input and output ports. It can be noted that any of sixteen nodes can communicate to any other node over a connection that passes through exactly two of the switching apparatus 10 blocks. For instance, Node 5 can send messages to Node 15 by traversing switch 10B and switch 10H. Since all connections are made through two switching apparatus 10 blocks, the network comprised of the eight switching apparatus 10 blocks is referred to as a two stage switching network. Other multi-stage networks can be configured from switching apparatus 10 blocks by using three stages, four stages, etc. in a similar manner. Thus, this network can be used to modularly increase the size of a parallel system comprised of PCs and/or workstations as nodes by simply changing the size of the switch network 30 and adding more PCs and/or workstations to interconnect to the expanded number of switch network ports.

Figure 5:
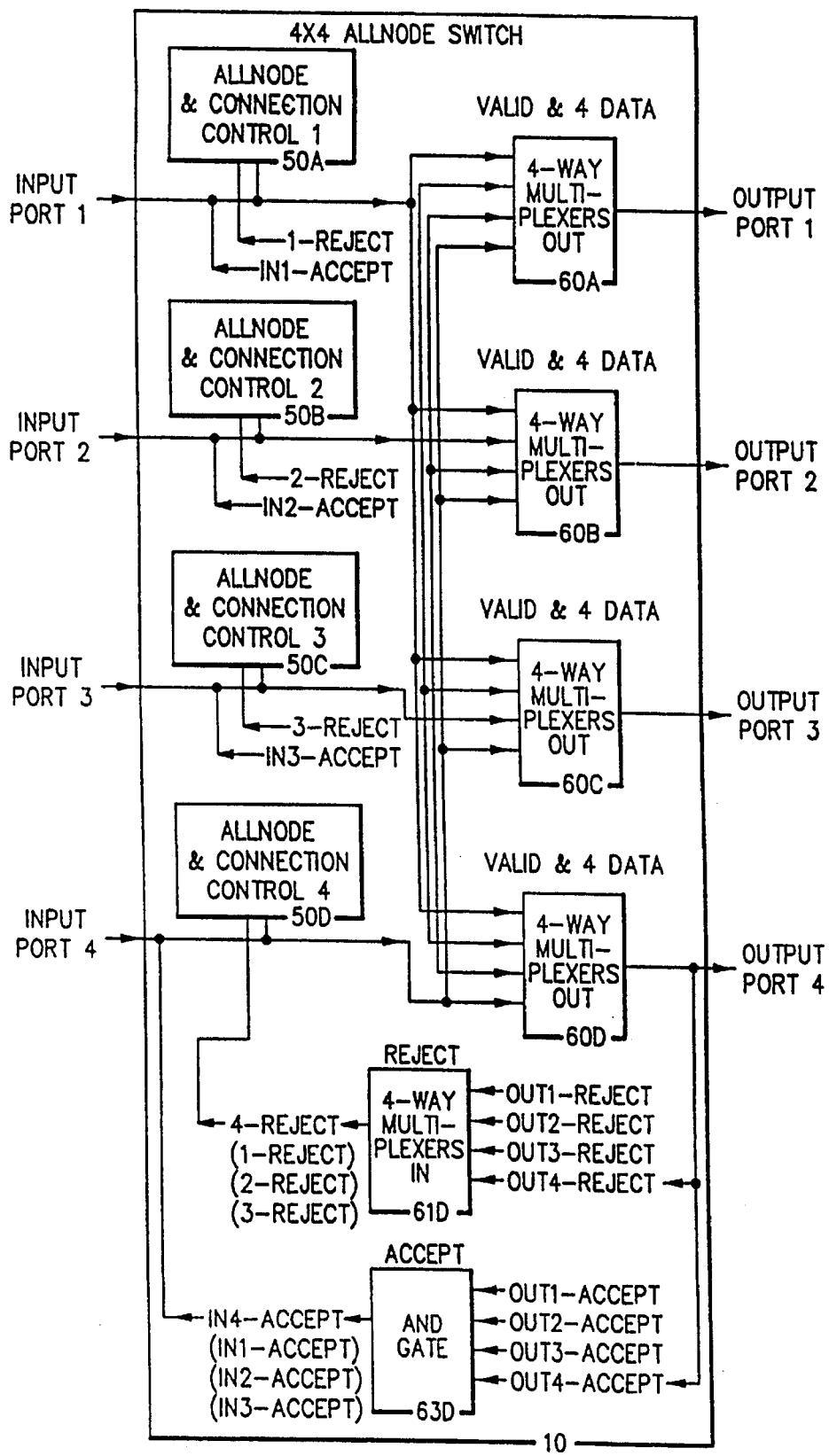
FIG. 5 shows a schematic block diagram of the simple digital data flow and control path implementations of the 4×4 crossbar switching apparatus, which has the capability of being used with the present invention to provide fully parallel switching means for interconnecting up to four system nodes for the purpose of transferring digital data.

Referring to FIG. 5, a functional diagram of the simple data flow across the switching apparatus 10 is illustrated. The VALID and four data lines at each input port, inside the switch, and at each output port are represented by a single line in FIG. 5 for simplicity. For instance, the VALID and four data lines entering switch 10 at IN PORT 1 go to five internal functional blocks of switching apparatus 10; these are blocks 50A, 60A, 60B, 60C, and 60D. Block 50A makes the decision as to which of the four possible output ports are to be connected to input port 1. The VALID and four data lines from each input port go to each output multiplexer block (60A, 60B, 60C, and 60D); this makes it possible to connect any input port to any output port. Each of the four output multiplexer blocks (60A, 60B, 60C, and 60D) is uniquely commanded from each of the control blocks (50A, 50B, 50C, and 50D) as to which of the four possible sets of input port lines is to be gated through to each output port. For instance, control block 50A can command multiplexer 60C to connect input port 1 to output port 3; control block 50B can command multiplexer 60A to connect input port 2 to output port 1; and control block 50C can command multiplexers 60B and 60D to connect input port 3 in a multi-cast fashion to output port 2 and output port 4. All three connections are capable of being established simultaneously or at different times. At the same time that multiplexers 60A to 60D form connections to move the VALID and data signals across switch 10 with a unidirectional signal flow from input port to output port, multiplexer 61D and AND gate 63D form signal connections for the REJECT and ACCEPT signals, respectively, with a signal flow in the opposite direction of output port to input port (typical implementations are shown by blocks 61D and 63D— similar blocks are associated with each input port). These REJECT and ACCEPT signals provide a positive feedback indication to switch 10 of actions taken either by subsequent switch 10 stages in a cascaded network or by the device receiving and interpreting the VALID and four data signals. A control header or digital message being transmitted through switching apparatus 10 over the four data signals under control of the VALID signal can be REJECTed by any network stage if it is unable to establish the commanded connection or by the receiving device if it is not capable of receiving the message at this time or if it detects an error in the transmission. The receiving device also has the capability of confirming the correct arrival of a command or message (without errors being detected) by pulsing the ACCEPT signal. Since the REJECT and ACCEPT signals go in the opposite direction from the data flow, they provide a means of reporting back a positive indication to the sender on whether the attempted transmission was received correctly or rejected.

Figure 6:
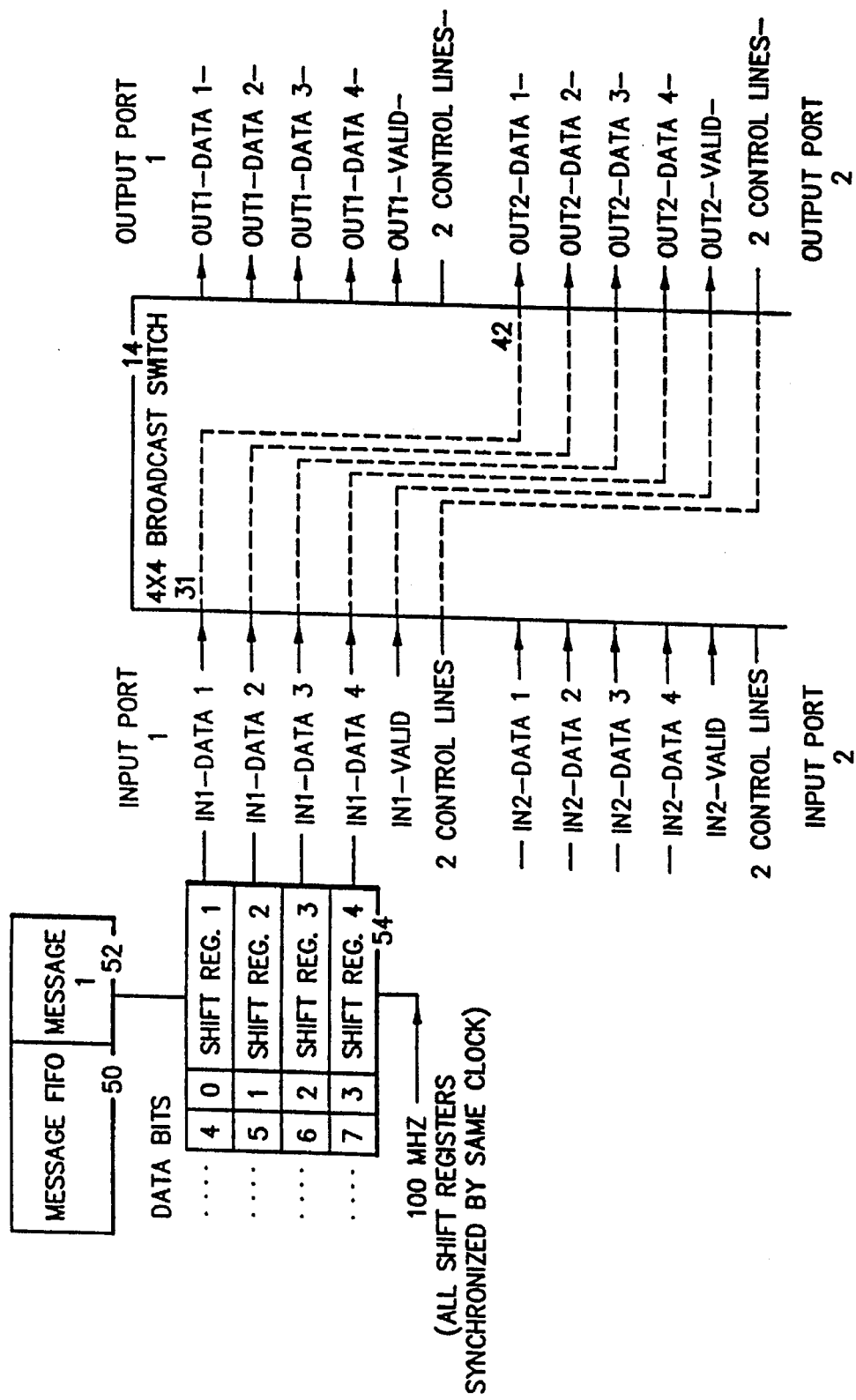
FIG. 6 illustrates a typical method for generating parallel control and multiple line serial digital data information to be sent to the 4×4 prior parent embodiment of the invention switching apparatus over four synchronous data lines.

Referring to FIG. 6, blocks 50, 52, and 54 illustrate a typical method for generating multi-line (parallel)/serial digital data in the form of a message which can be transmitted to and across switching apparatus 14, which is a partial drawing of the switching apparatus 12. Similar parallel/serial data generation logic as provided by 50, 52, and 54 can be used at each of the other input ports to switching apparatus 12. Each set of input data lines provides 4 serial data lines to a given input port which is synchronized to the same clock by the four shift registers 54 which create the parallel/serial data by shifting four synchronized lines of data 31 as controlled by the same identical clocking signal (100 MHZ in FIG. 6). However, the four different input port sources to switching apparatus 14 can be asynchronous to each other, being based on different, non-synchronized, 100 MHZ clocking signals.

The process for sending parallel/serial messages through switching apparatus 14 involves FIFO 50, which accumulates data messages to be transmitted. The next entire message to be transmitted is moved to buffer 52. The message stored in buffer 52 is moved to shift registers 54 in preparation for transmittal and the data is dispersed across the four shift registers 54 by placing data bit 0 into the first bit of shift register 1, data bit 1 into the first bit of shift register 2, data bit 2 into the first bit of shift register 3, data bit 3 into the first bit of shift register 4, data bit 4 into the second bit of shift register 1, etc. Shift registers 54 then begin to send serial data to switching apparatus 14 over four synchronized data lines, in such a manner that the parallel/serial data flows continuously until the entire message has been transmitted. The switch apparatus 14 uses the first eight bits transmitted (in the first two clock cycles of serial data over interface 31 from serial registers 54 to switching apparatus 14) to select and establish a connection path through the switching apparatus 14. The example in FIG. 6 illustrates via dashed lines, the switching apparatus establishing a temporary connection between input port 1 31 and output port 2 42, such that each of the eight individual lines in interface 31 are uniquely and directly connected to each of the corresponding lines in interface 42.

Figure 7:
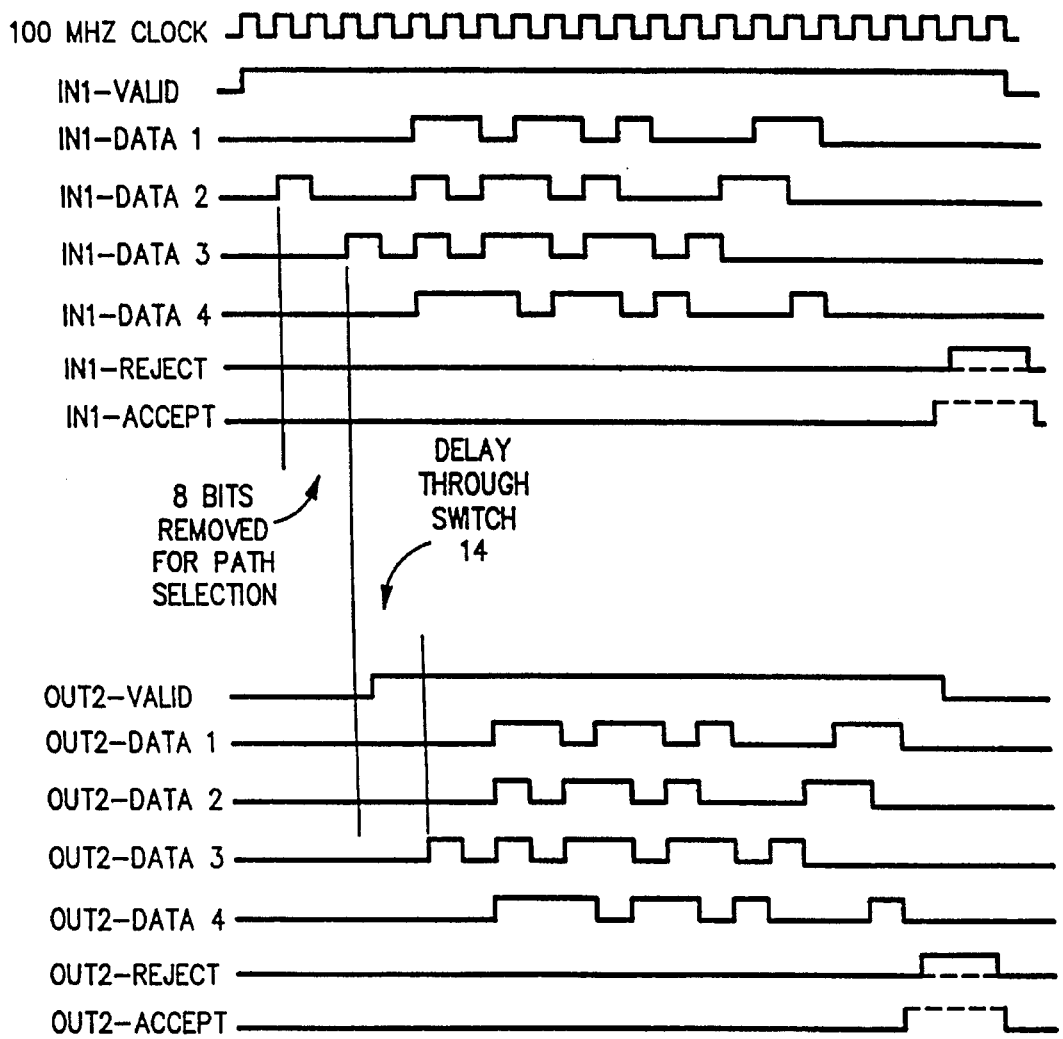
FIG. 7 shows a typical timing diagram for routing the digital interface signals arriving at one input port of the 4×4 prior parent embodiment of the invention switching apparatus to one output port.

Referring to FIG. 7, typical serial waveforms are shown for both input and output ports of the switching apparatus 14. The switch removes the first 8 bits of the serial transmission as sent by shift registers 54 and uses them to make and hold a connection, such as interface 31 to interface 42. The remainder of the serial message in this example is transferred directly from interface 31 to interface 42, so that interface 42 sees that exact same message that interface 31 receives, minus the first 8 bits and delayed by the circuit delays encountered by the serial data as it traverses the switching apparatus 14. Switching apparatus 14 does not buffer or re-clock the serial data entering via interface 31 in any manner; it merely reflects as quickly as possible the input waveforms it receives over interface 31 to output interface 42 without changing them in any way, except to strip off the first 8 bits.

The convention for indicating to a switch 14 input port over an interface (such as 31) that there is no transfer in progress, is to issue continuous IDLE commands, which are denoted by the 4 data lines and the VALID control line being held at logical 0's. The detection of a logical 1 on any of the input lines will signify the departure from the IDLE state and signify to the switch that a selection and transfer is beginning. Likewise, the output lines from the switch will be held in the IDLE state (at all 0's), when there is no active transfer in progress.

In general, all switches require a path selection method, whereby they are commanded which connection (input port to output port) to establish. For switching apparatus 10, the path selection command is transmitted to the switch over the same interface that the data is transferred; i.e., the 4 data lines associated with each input port. Selection information must be transferred prior to the data, so that the commanded interconnections can be established and the data can then flow to the commanded destination. The selection information need NOT identify an input port number (1 to 4), because it is arriving at the switch over a specific input and the switch already knows what input number it is receiving data on. Therefore, the selection information need ONLY specify the number (1 to 4) of which one of the four output ports of switching apparatus 10 to which to connect. The method of path selection recommended here is one out of N encoding with a return to zero (called a DEAD FIELD).

Figure 8:
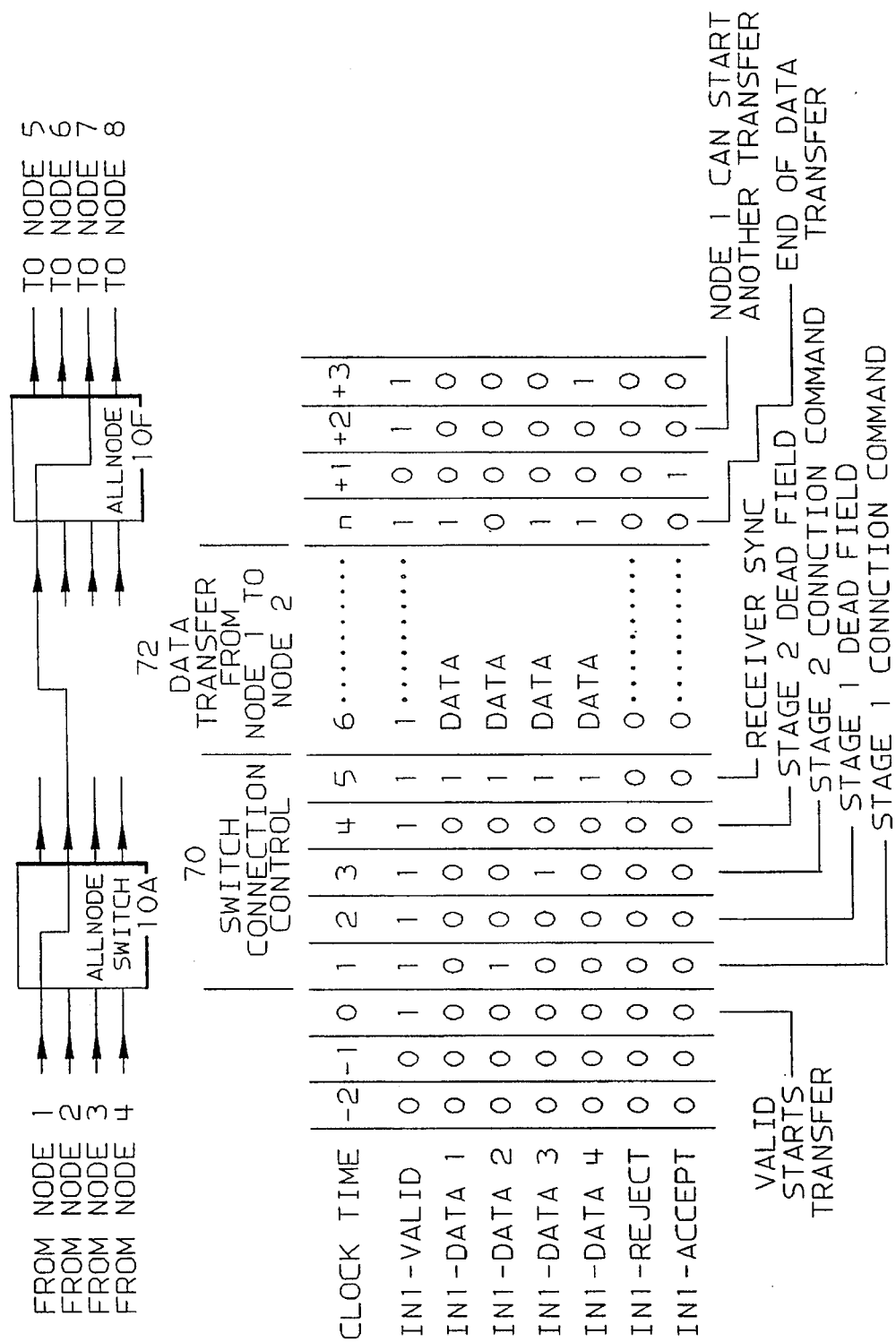
FIG. 8 illustrates the typical method of selecting and establishing a transmission path through a network comprised of the invention switching apparatus for the purpose of sending digital data from one node to another.

Referring to FIG. 8, a typical example of the exact serial bit patterns and control signal activation is shown for sending control and digital data information to switching apparatus 10. The example references the cascaded, two stage switching network shown in FIG. 4 and involves sending data across the network from node 1 through switching apparatus 10A and 10F to node 7. To make this connection, input port 1 must be connected to output port 2 of the first stage switching apparatus 10A, and input port 1 must be connected to output port 3 of the second stage switching apparatus 10F. The signal sequence that is sent to input port 1 to cause the desired connections in switching apparatus 10A and 10F is shown in FIG. 8. In the signal sequence of 1's and 0's, time advances from left to right, so that the values seen at clock time −2 arrive at switch 10A first, and the values at clock time −1 arrive second, etc. The values of the IN1-DATA and IN1-VALID lines are all zeroes and cause nothing to happen at switch 10A during times −2 and −1, because they indicate IDLE. At clock time 0, the IN1-VALID line goes to a logical 1. This prepares switch 10A by enabling the input port 1 to receive data, but no connection or action takes place at switch 10A at this time. The IN1-VALID control line basically enables the corresponding switch input port; when IN1-VALID is a logical 0, switch 10A cannot make any connections or receive any data from input port 1, which is held RESET. Finally, at clock time 1, switch 10A receives its command as to what output port to connect to; the command is received entirely during clock time 1.

The command bit pattern sent at clock time 1 is used by switch 10A to establish connection to an output port; this process is referred to as a path selection operation and takes place completely internal to switch 10A. The path selection approach implemented by the switch is to let each of the 4 IN1-DATA lines to define a unique output of switch 10A to be selected. For instance, IN1-DATA1 signal going to a logical 1 at time 1 tells switch 10A to connect to output port 1, IN1-DATA2 commands connection to output port 2, etc. In our example, since IN1-DATA2 goes to a logical 1 during clock time 1, switch 10A is thereby commanded to connect to output port 2. In other words, the connection algorithm is that the first data input line going to a logical 1 after an input port has been enabled, defines the connection which that input port is to make. This is a mutually exclusive process, in that for the normal case only one data line at clock time 1 is allowed to be a logical 1; the other 3 data lines must be 0's. Note that since 1 bit of selection information is guaranteed to be a logical 1, switch 10A will be able to recognize the start of a transmission without requiring any additional bits to signify that a transfer is commencing. The switch 10A makes the commanded connection by removing the 4 bits from the data lines and storing them in a selection register in control block 50A of FIG. 5. The bits transmitted during clock time 1 are not passed through switch 10A to switch 10F, but instead switch 10A begins passing the very next 4 bits of data corresponding to clock time 2 to the next switch 10F. However, the information bits following a selection command (those transmitted by the 4 data lines at clock time 2 in our example) must always be all zeroes (a DEAD FIELD) as shown in FIG. 8. The purpose of this will be explained subsequently.

At clock time 2, the connection of switch 10A input port 1 to output port 2 is established and causes the signal sequence at clock time 2 to be transmitted across switch 10A and the interconnecting wires to switch 10F input port 1. From this time on, switch 10A merely transmits all subsequent data immediately to switch 10F input port 1; it never examines or takes any action on any other data patterns presented to switch 10A over its input port 1 interface. It just passes all data patterns it receives over input port 1 immediately to the output port 2 and switch 10F. Thus, at clock time 2, assuming zero delay across switch 10A and its associated cable, switch 10F input port 1 sees the VALID signal rise and the all zeroes DEAD FIELD on the 4 data lines coming into switch 10F input port 1. In this way, at time 2, switch 10F input port 1 is enabled in an identical manner to the way switch 10A input port 1 was enabled previously at time 0.

In our example, IN1-DATA3 goes to a logical 1 during clock time 3 and switch 10F is thereby commanded to connect its input port 1 to its output port 3, in a manner similar to the way switch 10A was commanded to connect its input port 1 to its output 2 during clock time 1. The switch 10F in making the commanded connection, removes the 4 bits at clock time 3 from the data lines, and stores them in the selection register which is part of control block 50A of FIG. 5. The bits transmitted during clock time 3 are not passed through switch 10F to Node 7, but instead switch 10F begins passing the very next 4 bits of data corresponding to clock time 4 to Node 7. However, the information bits following a selection command (those transmitted by the 4 data lines at clock time 4 in our example) must always be all zeroes (a DEAD FIELD) as shown in FIG. 8. Thus, by clock time 4, switches 10A and 10F have established a connection path for transferring data directly from Node 1 to Node 7. Up to clock time 5, Node 7 sees nothing but IDLE commands. At time 4, Node 7 sees the OUT3-VALID line from switch 10F go active and is thereby enabled to start receiving data at time 5. From time 5 on, Node 7 can receive data from Node 1 over the 4 OUT3-DATA lines from switch 10F. The protocol of the actual data being transmitted can be any of the normal formats such as manchester encoded, 8/10 bit encoding with preamble, etc. However, the preferred embodiment, as shown in FIG. 8 is an all ones synchronization field at time 5, followed by the NRZ data message. The data message can specify the word count length of the transfer. The purpose of the synchronization field of all ones as a prefix to the actual data message, is to enable the receiving node 7 to synchronize to the sending node 1 in one clock time. This assumes that the two nodes involved in the data transfer have clocking systems that are asynchronous to each other, but are operating at the same frequency within a specified tolerance.

The preferred embodiment is to transmit the word count length of the message first during clock time 6 and clock time 7. Node 7 then decrements the length count and can detect when the transfer is complete. Node 7 can then check the message for accuracy using the selected error detection method parity, ECC, or CRC). If the message has been received correctly, Node 7 responds by activating the ACCEPT interface line back to switch 10F at clock times n+1 and n+2. Switch 10F passes the ACCEPT indication back to switch 10A, which in turn returns it immediately to Node 1. This indicates to Node 1 that the transfer completed successfully, and Node 1 resets its VALID and 4 data lines to switch 10A to zeroes, thus, completing the data transfer and returning to the IDLE state. The IN1-VALID input line to switch 10A going to a zero at time n+3, causes switch 10A input port 1 to break its connection to output port 2 and to return to the IDLE state. Immediately, switch 10F sees its IN1-VALID input line go to a zero, breaks its connection to output port 3 and returns to the IDLE state. Thus, the connections can be broken and the switches returned to IDLE in as little as one clock time. If Node 1 has another message to transmit, it can load the next message into buffer 52 and shift registers 54 (FIG. 6), and begin transmission to Node 7 or any other node as soon as time n+4. The only restriction is that the VALID signal generated by Node 1 must return to zero for a minimum of one clock time (time n+3) to signify the end of one transfer before beginning another.

If Node 7 finds an error in the message it has received after the word count has gone to zero at clock time n, it responds by activating the REJECT interface line (instead of ACCEPT) back to switch 10F. Switch 10F uses the incoming REJECT signal from Node 7 to break its connection to Node 7, to return to the IDLE state, and to pass the REJECT indication back to switch 10A, which in turn returns it immediately to Node 1 after breaking its connections and returning to IDLE. Node 1 then notes that the transfer has been rejected, and returns to the IDLE state by resetting its VALID and 4 data lines to switch 10A to zeroes. Node 1 may then retry the transmission by reloading shift registers 54 from buffer 52 and starting the transmission over again from the very beginning (clock time −1). The retransmission can occur over the identical path as the previously rejected transmission, or if alternate paths through the network are implemented another path can be tried. If continuous REJECTs are encountered, such that a specified number of REJECTs occur for the same message, an error reporting mechanism may be invoked.

It is also possible for any switch 10 in a network path to REJECT a message. This can occur for either of two cases:

1) BUSY—If the output port to which the switch is commanded to connect is BUSY (i.e., it is being used by a previously established connection), the switch will signify this condition to the input port issuing the command by activating the REJECT line back to the previous network stage or to the transmitter (if the first stage of the network detects BUSY). For instance, in the example shown in FIG. 8, if 10A had received a command at clock time −2 to connect input port 4 to output port 2, that connection would have been active when input port 1 requested to be connected to output port 2 at clocktime 1. In this case, output port 2 is BUSY at clock time 1 and switch 10A would activate the IN1-REJECT line to Node 1. As described above, the transmitter may retry any REJECTed message. Likewise, the connection could be made successfully at switch 10A, yet output port 3 of switch 10F could be BUSY at clock time 3, causing switch 10F to issue the REJECT signal to switch 10A. This, in turn, causes switch 10A to return REJECT immediately to Node 1 after breaking its connections and returning to IDLE.

2) Simultaneous CONTENTION—Rather than input port 4 establishing a connection to output port 2 in switch 10A at clock time −2 as described above (in advance of the same command from input port 1 at clock time 1), it is possible for two or more input ports to try to connect to the same output port at approximately the same time. This is called CONTENTION for an available output port. For instance, suppose input ports 1 and 4 both sent simultaneous commands at clock time 1 requesting to be connected to output port 2. The present invention resolves this contention by first connecting both contending input ports 1 and 4 to output port 2. The net effect is to electrically connect the 2 input ports to output port 2, which will logically OR the signals coming from both sources. During clock time 2 the logical OR of the 2 input ports will NOT cause an error, because the values present on both input ports 1 and 4 are identical: the VALID lines for each are logical 1's and the data lines for each contain the DEAD FIELD (logical 0's). However, at clock time 3, the signals from each source could be different and an error could be caused if the 2 input ports both remained connected at clock time 3 and later. In other words, switch 10A has 1 cycle time (clock time 2) to correct the decision it made to connect two or more inputs to the same output. Switch 10A makes this correction during clock time 2 by detecting the fact that more than one input is connected to a given output. It then takes action by resetting all but one of the multiple connections, and does this before clock time 3 occurs. The decision of which connection(s)to reset and which one to keep is a decision based on priority.

For the preferred embodiment, a simple priority scheme is used as follows: If input port 1 is contending it gets the connection, If input port 1 is not contending and input port 2 is, input port 2 gets the connection. If input ports 1 and 2 are not contending and input port 3 is, input port 3 gets the connection. Input port 4 gets the connection only if no other input port wants it. Applying the priority selection to our example, input port 1 gets to keep its connection to output port 2, while the connection of input port 4 to output port 2 is reset during clock time 2. This results in the REJECT signal being issued in the normal fashion from switch 10A to input port 4.

Thus, the purpose of the DEAD FIELD in the present invention is to allow one clock time per switch stage to resolve simultaneous contention. The secondary purposes of the DEAD FIELD are to cause a falling edge on the selection bit which was active during the previous clock time, and to compensate for timing skew which might be present across the 4 data lines carrying serial selection data to the cascaded switches. Both the rise and fall of data bits commanding the switches to make connections gives the unclocked switch two clock edges (rise and fall) on which it can trigger and make decisions. These are the only two decision making times available.

Figure 9:
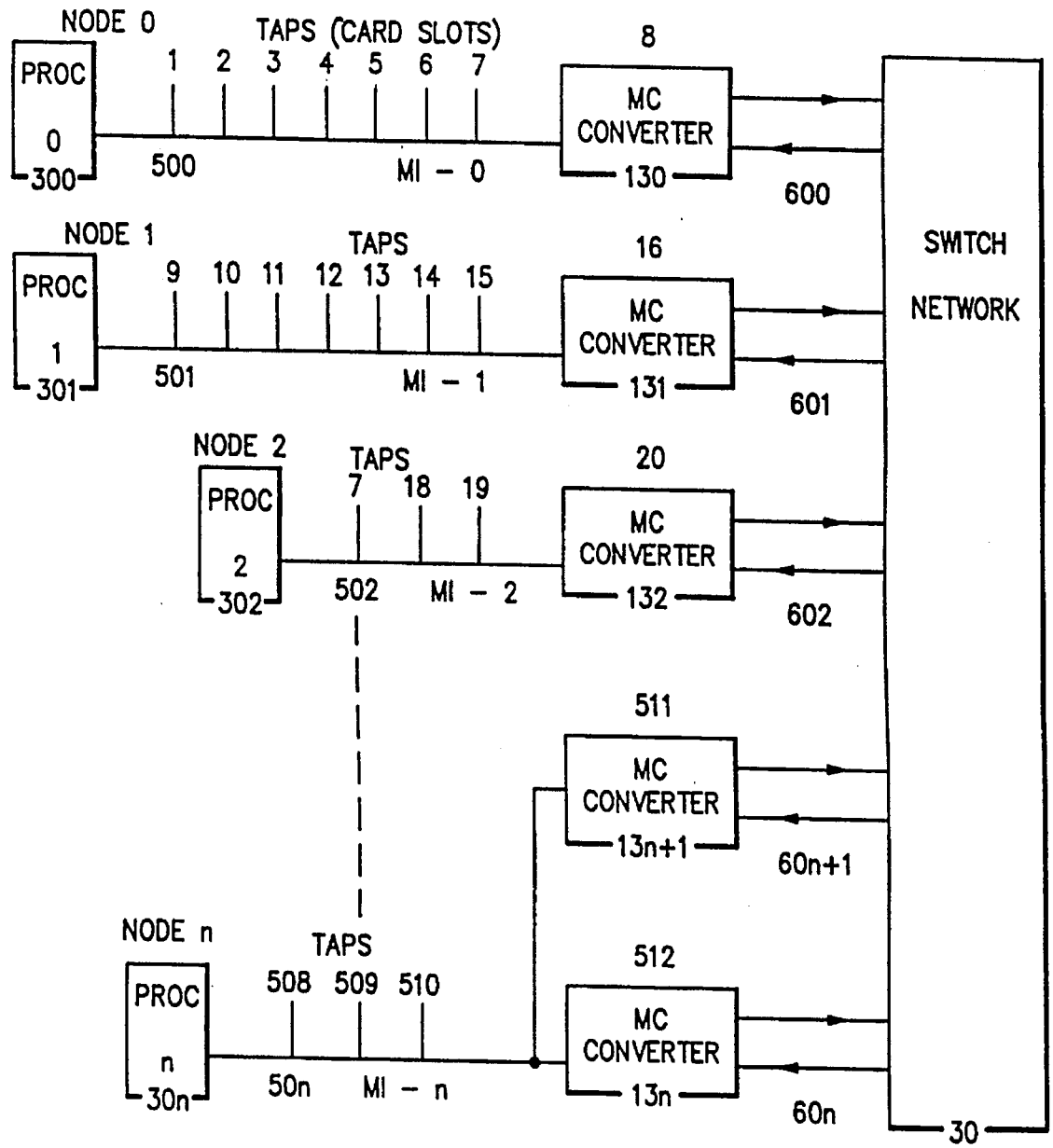
FIG. 9 illustrates generally the interconnection of multi-drop busses via a multi-stage switch network, where two or more paths from each multi-drop bus can be provided.

Referring to FIG. 9, an alternative embodiment is shown, where any system node, such as node n, can implement multiple connections to the switch network 30. FIG. 9 shows node n having two multiple paths to network 30. Each multiple path requires that a card slot be used to implement a MicroChannel converter function. FIG. 9 shows that MCC 13$n$+1 has been added to card slot 511 to provide a second separate path 60$n$+1 from MicroChannel bus 50$n$ to switch network 30. Any node can implement more than one path to network 30 to improve performance and reliability, regardless of whether the other nodes implement multiple paths or not. The maximum number of multiple paths from any node to network 30 is limited by the number of expansion card slots available at that node.

The Network Adapter

Referring to FIGS. 10–14, adapter 130 (also referred to as MC converter 130) serves as a bridge from microchannel bus (MC) 500 to the switch network and has both an MC and switch interface, and it implements hardware which enables the two to work together. The primary function of adapter 130 is to convert the memory or I/O addresses presented by the initiating microchannel device into a means of locating the exact MC multi-drop buss (MI), where the addressed memory location or I/O device resides. To do this, an addressing convention is required. Several possible addressing conventions implemented by adapter 130 are shown below, in regards to the 32-bit address field supported by MC 500:

| 512 MI OPTION | ADAPTER ADDRESS - 16 bits<br><br>FROM POS Registers<br>MSB                  LSB | DESTINATION MI FIELD<br><br>9 bits | DEST. MI TAP<br><br>5 bits | 00<br><br>Byte Addr |
|---|---|---|---|---|

OR

-continued

| | ADAPTER ADDRESS - 13 bits | | DESTINATION MI FIELD | DEST. MI TAP | 00 |
|---|---|---|---|---|---|
| 4096 MI OPTION | FROM POS Registers | | 12 bits | 5 bits | Byte Addr |
| | MSB | LSB | | | |
| MC | 31 | | 15 16 | | 0 |

OR

| | DESTINATION MI ADDRESS | | DEST. MI TAP | TRANSFER COUNT | 00 |
|---|---|---|---|---|---|
| DIRECT MI OPTION | | | 5 bits | | Byte Addr |
| | MSB | LSB | | | |
| MC | 31 | | 15 16 | | 0 |

Using this address convention would allow the adapter to operate in any of three modes: an extended MC supporting up to 512 or 4096 MI's, or a direct address mode supporting various numbers of MI's. These or other options could be selected by bits in a Programmable Option Select (POS) register. In 512 mode, up to 512 different MI's can be specified and 16-bits of adapter address recognition are required based on another POS register stored in the adapter. In 4096 mode, up to 4096 different MI's can be specified and 13-bits of adapter address recognition are used. In the direct addressing mode, a POS register in the adapter defines which destination MI address the adapter is NOT to respond to (this address specifies that a tap on the local MI is being addressed), and the adapter responds to all other addresses. Thus, the initiating device of an MC transfer on any MI indicates two things by issuing an address to the MC:

1) Whether the transfer is for an I/O tap on its own MI or if it is to the extended MC via the adapter, which will relay the transfer to another MI. If the transfer is to another MI, the high order bits of the 32-bit address activate the adapter to respond to the transfer based on the contents of POS registers, which have been stored at initialization time to the adapter.

2) To which MI the adapter is to transmit the MC transfer based on the selection bits in the 32-bit MC address which define the Destination MI address or field.

The adapter responds to any MC transfers addressed to it, and relays the transfer through the switch network by locating the proper destination MI. At the destination, the adapter receives a transfer from the switch network and can either interrupt the proper destination tap on the destination MI, or arbitrate for the local MI and send the transfer to the addressed tap using the low order bits of the original 32-bit address, which is also sent to the adapter at the destination MI.

Likewise, I/O devices located on various MI's can be addressed over the switch network. However, MC I/O addresses use only 16-bits, which drastically reduces the I/O addressing flexibility and requires that other options be used. Smaller systems can use a reduced subset of the addressing options described above. For larger systems other options are possible as follows:

1) Every adapter could contain a look-up table loaded at initialization time that defines the network address of every I/O device (which MI it is located on) and the tap address of every I/O device on its local MI. However, this could yield a rather large look-up table at every adapter.

2) The look-up table could be implemented at one or several taps of the system and every adapter could store in a POS register the network address of the tap it was supposed to address to find the look-up table. Each adapter would respond to every I/O device address to the extended MC by going to the tap defined by its POS register to find and use the look-up table over the network, and then send the I/O transfer to the network address received from the look-up table.

3) Reduced versions of methods 1) and 2) that only allow a small fixed size look-up table or a small cache to contain the most recently used I/O addresses—so that the adapter would not have to use the network look-up facility for every individual I/O transfer.

4) Treat all I/O devices as being memory mapped, so there are no 16-bit I/O addresses to translate.

The System

Figure 10:
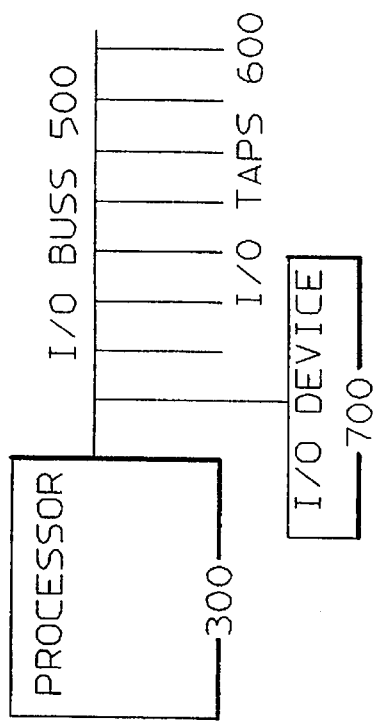
FIG. 10 illustrates generally multi-drop bus technology with a processor controlling a multi-drop I/O bus.

Referring to FIG. 10, the state-of-the-art bus architecture is shown using a multi-drop bus technology, where Processor 300 generates and controls Multi-drop I/O Bus 500 as a means for communicating with multiple I/O devices 700, each of which is connected to the Multi-drop I/O Bus 500 by an individual I/O Tap 600. Each I/O Tap adds capacitance, noise, and loading to the Multi-drop I/O Bus 500, which causes bus performance to decrease as the number of I/O Taps increase, causing very restrictive limits to bus size and performance. As previously noted, an example of a multi-drop I/O bus 500 is a Microchannel bus. This is a short, high performance parallel bus which is four bytes wide and, with today's technology, may not exceed about 16 inches in length, and runs at about 20 MHZ. Due to this length restriction, such a multi-drop I/O bus 500 cannot be enlarged to extend beyond the mother board or backplane. The present invention solves this restriction by permitting an unlimited number of I/O Taps without a corresponding performance degradation.

Figure 11:
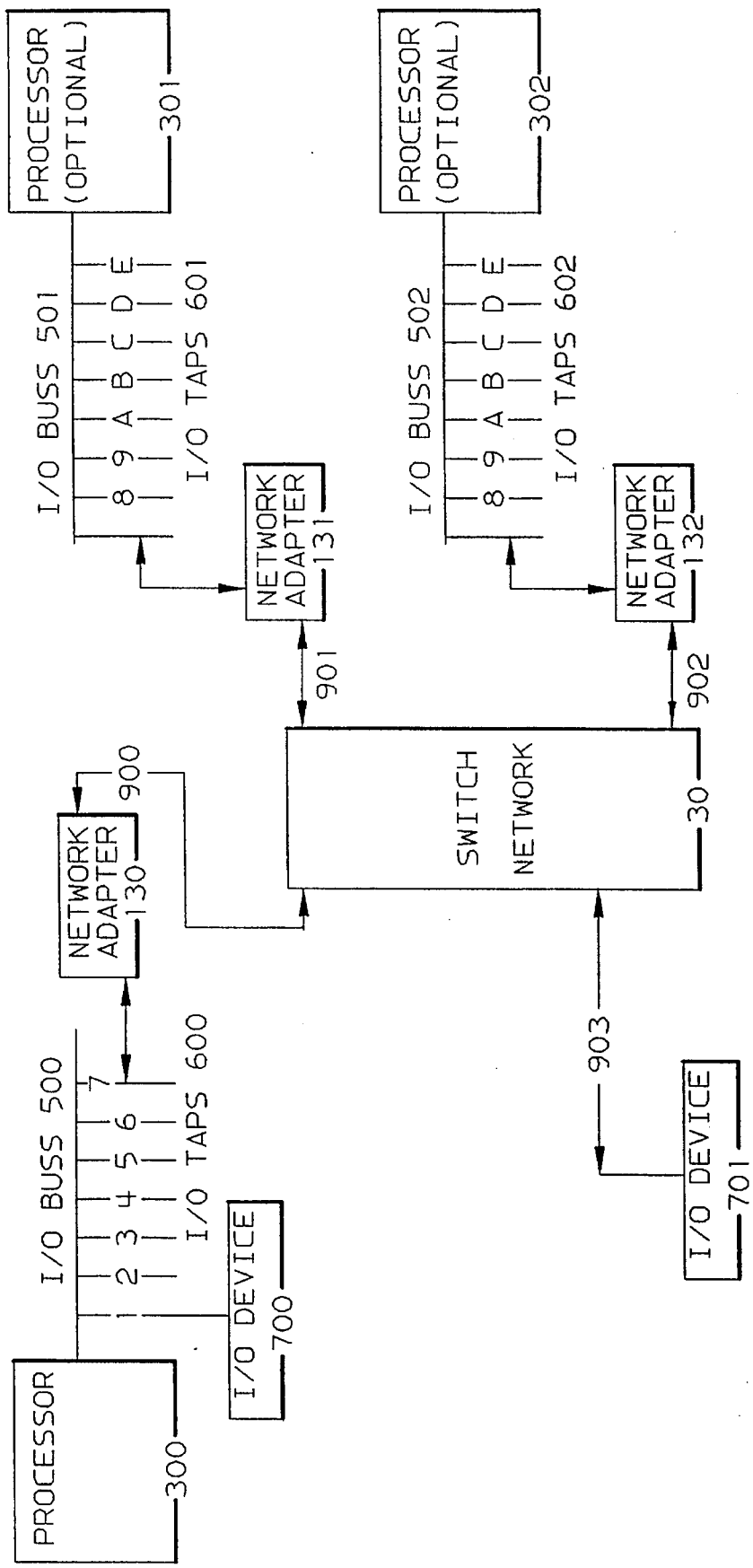
FIG. 11 illustrates generally an embodiment of the system For extending a bus architecture including network adapters between buses and the switch network and an I/O device directly connected to the switch network.

Referring to FIG. 11, the means for extending a bus architecture associated with Processor 300 and I/O Bus 500 is shown based on using a Network Adapter 130 and a Switch Network 30. The Network Adapter 130 can reside on any I/O Tap 600 emanating from I/O Bus 500. The concept is that the Network Adapter 130 is used to present only one single load or tap to I/O Bus 500. The Network Adapter 130 is a two-sided adapter: on one side it connects to and supports the multi-drop bus architecture of I/O Bus 500, while on the other side it connects to and supports the architecture of the Switch Network 30 through a point-to-point connection (switch tap or node) 900. The function of the Network Adapter 130 is to convert the limiting multi-drop bus architecture to a point-to-point switch architecture which is free of expansion limitations. The Switch Network 30 has unlimited expansion because it never uses multi-drop connections and can thus fan-out in an unlimited manner on a point-to-point connection basis, free of the capacitance, noise, and loading problems of the bus architecture.

Bus 500 can be expanded via Switch Network 30 in two ways. First, as representatively shown by I/O Device 701, I/O devices can be directly connected to any Switch tap or node. This permits Processor 300 to communicate over I/O Bus 500, through Network Adapter 130, over Switch tap 900, through Switch Network 30, and over Switch tap 903 to I/O Device 701. Since, Switch Network 30 is virtually unlimited in expansion capabilities, Processor 300 then becomes virtually unlimited in the number of I/O Devices that it can connect to. The second method of expansion is shown representatively by Network Adapters 131 and 132. This method permits one multi-drop bus to be connected to a plurality of multi-drop busses, such as bus 500 connecting to busses 501 and 502. This second method permits Processor 300 to communicate over I/O Bus 500, through Network Adapter 130, over Switch tap 900, through Switch Network 30, and over Switch tap 901 to Network Adapter 131 and I/O Bus 501; or over Switch tap 902 to Network Adapter 132 and I/O Bus 502. Thus Processor 300 can connect to any of the I/O Devices attached to the I/O Taps 8 to E on Bus 501 or to any of the I/O Devices attached to the I/O Taps F to L on Bus 502, or the direct network tap at 903. Thus, multiple busses with limited connection capability can be interconnected to become unlimited over Switch Network 30. In addition, each I/O Bus 50n (where n=0,1,2 etc.) is capable of optionally supporting its own processor, such as Processor 301 or 302. When multiple processors are used, a new dimension of parallel communication comes into play which increases performance of the "bus interconnected by switch network" (switch-based) system. Even though the whole system appears to be interconnected to a single bus, each of the busses 50n can operate simultaneously as an individual unit. For instance, Processor 300 over Bus 500 can be communicating with I/O Device 701, while simultaneously Processor 301 can be communicating with any I/O device attached to Bus 501 or Bus 502. Thus, the switch-based system works just the opposite of the multi-drop bus system, as the switch-based system expands more opportunities for parallel communication are introduced and performance increases.

Figure 12:
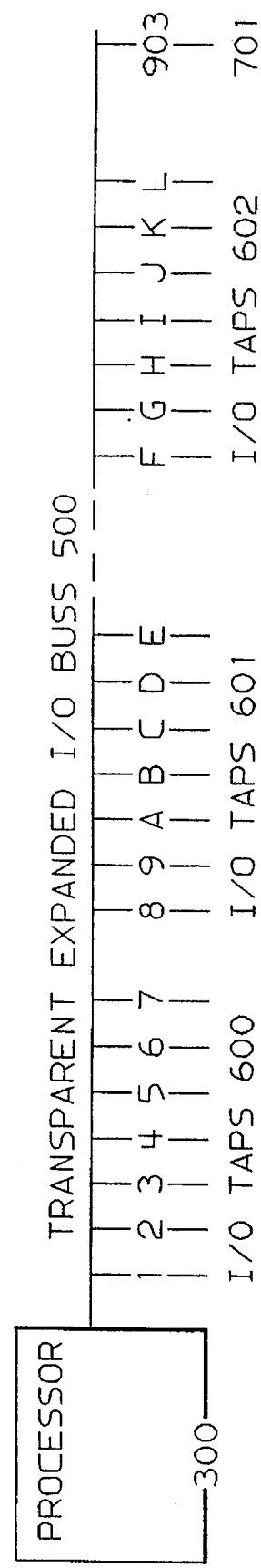
FIG. 12 illustrates how the system would appear transparent to a processor.

An important feature of the present invention is shown in FIG. 12. In addition to providing virtually unlimited expansion of the previously very restricted bus architecture, the present invention causes the expansion to appear transparent or invisible to Processor 300. FIG. 12 shows the Processor's view of the switch-based system described in FIG. 11. Processor 300 addresses the communication to all I/O Taps 600, 601, 602, and 701 as if they all resided on a single I/O Bus 500, as if the single I/O bus 500 were free of physical limitations. The invention provides Processor 300 with an addressing and connection scheme that is totally controlled by the Network Adapters 130 and the Switch Network 30 in such a manner that the Processor does not get involved with the physical expansion of the Bus 500, but deals only with a single image addressing system. The switch based system is flexible enough to provide either I/O device addressing or expanded memory addressing; i.e., some of the I/O devices 700 on I/O Bus 500 can be memory only devices. The memory in these memory devices can be read or written from Processor 300 over Bus 500. Various addressing schemes are disclosed below for both the addressing of memory or I/O devices over Bus 500.

Figure 13A:
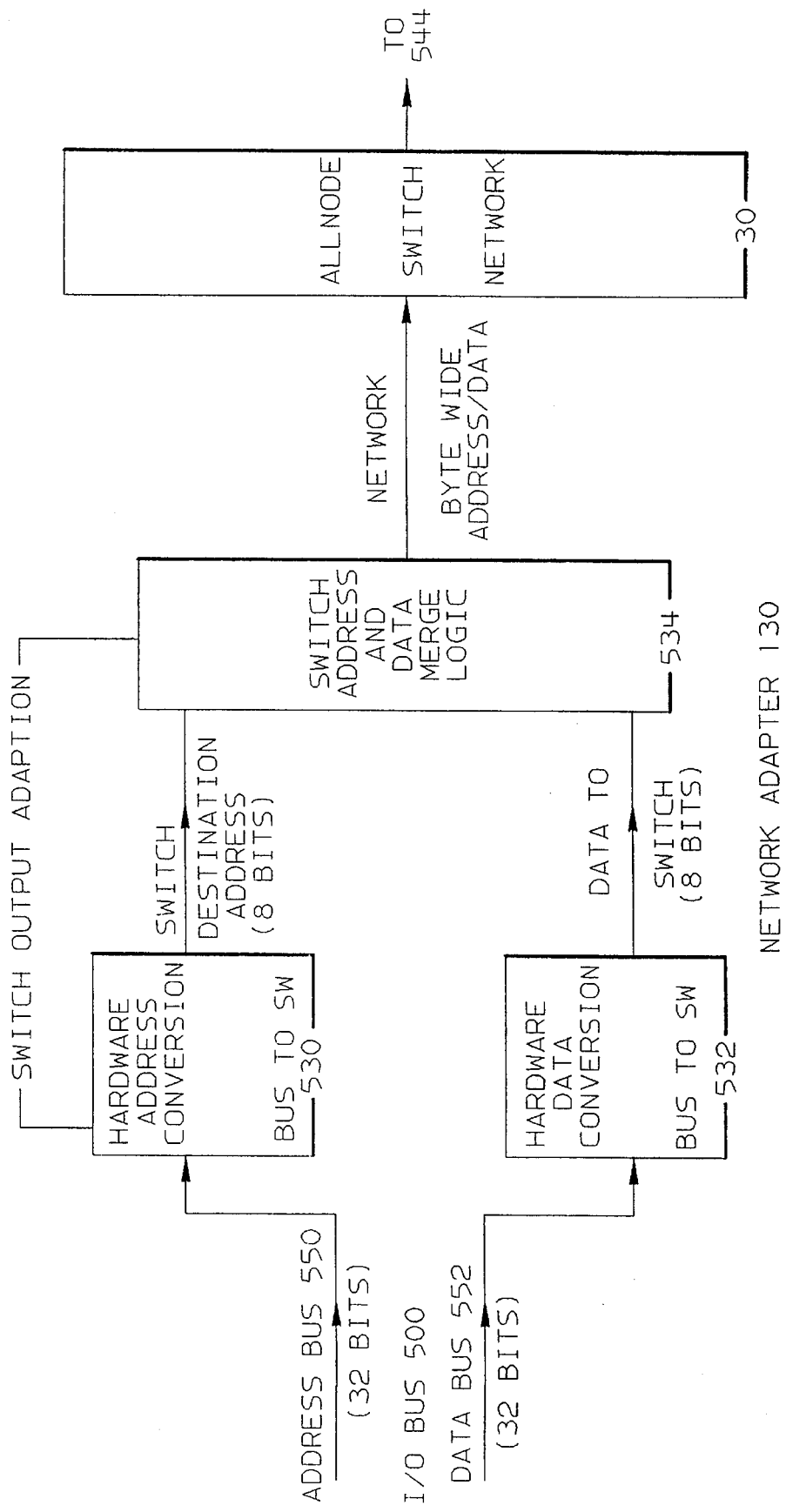
FIG. 13 illustrates generally the functional details of the network adapter.
Figure 13B:
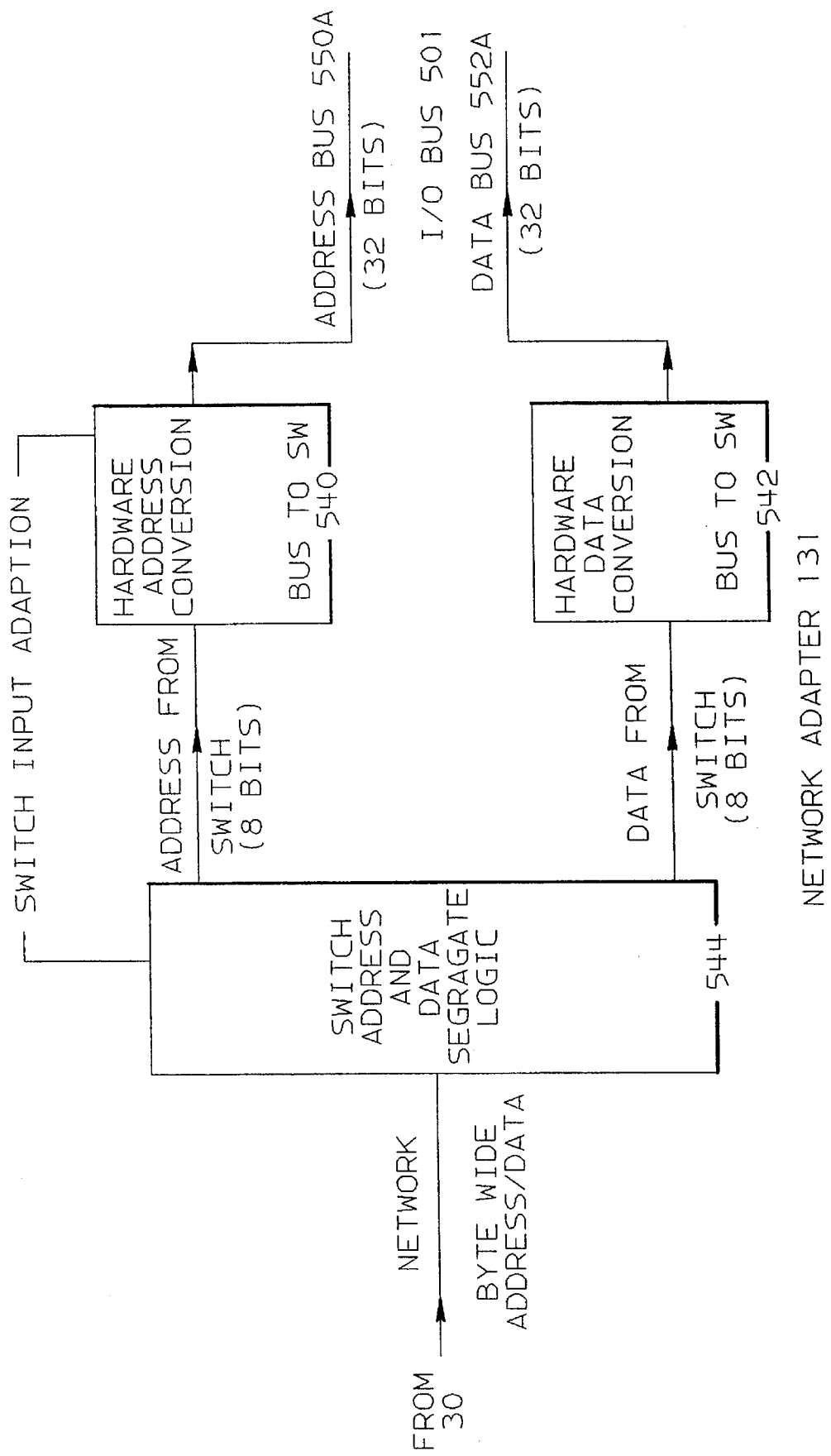

Referring to FIG. 13, further functional details of Network Adapter 130 are shown. FIG. 13 shows the details of Network Adapter 130 and 131 in relation to interconnecting two I/O Busses 500 and 501 through Switch Network 30. The example assumes that I/O Bus 500 is addressing and sending data to an I/O Device on I/O Bus 501. The Network Adapter functions are split into two sections: Switch Output Adaption and Switch Input Adaption. Functional blocks 530, 532, and 534 are associated with Network Adapter 130 and are receiving address and data from I/O Bus 500, converting them, and sending them to Switch Network 30; thus blocks 530, 532, and 534 are performing the Switch Input Adaption. Functional blocks 540, 542, and 544 are associated with Network Adapter 131 and are receiving information from Switch Network 30, converting to address and data for I/O Bus 501; thus blocks 540, 542, and 544 are performing the Switch Output Adaption. Each Network Adapter is composed of both a Switch Output Adaption section and a Switch Input Adaption Section; however, the Switch Output Adaption is not shown in FIG. 13 for Network Adapter 130, and the Switch Input Adaption is not shown in FIG. 13 for Network Adapter 130 for simplicity. Since each Network Adapter is composed of both a Switch Output Adaption section and a Switch Input Adaption Section, the reverse process works equally well; i.e., I/O Bus 501 is capable of addressing and sending data to an I/O Device on I/O Bus 500 using the Switch Output Adaption section of Network Adapter 131 and the Switch Input Adaption Section of Network Adapter 130.

The Switch Output Adaption section is comprised of blocks 540, 542, and 544. Most Bus Architectures provide separate address and data busses; thus, I/O Busses 500 and 501 in FIG. 13 are assumed to be busses of identical architectures that are comprised of a 32-bit address bus and a separate 32-bit data bus. The present invention works equally well for various size busses and for shared address/data busses; their adaption is similar but not shown or further discussed herein. Most Switch Networks use smaller interfaces and operate at higher frequencies than multi-drop busses, because they use only point-to-point wiring. Therefore, a byte-wide switch interface is assumed in FIG. 13 as being a common switch interface, where the same interface 900 (FIG. 11) carries both destination and data information. However, the present invention works equally well for various types and size switch interfaces.

Block 530 performs the conversion from Bus Address to Switch Destination Address. Bus 500 addresses a particular I/O Device attached to one of its bus taps by sending a unique 32-bit address over the Bus Address lines 550, which is a part of Bus 500. During initialization of the bus, each I/O Device is given the range of addresses to respond to. The Network Adapter 130 is an I/O Device on Bus 500, and therefore it is told during initialization which range of addresses to respond to. Block 530 monitors every address on Address bus 550 looking for an address within its preassigned range. If an address is not within its range, Block 530 does nothing. If an address is within its range, Block 530 accepts the address and converts it to a destination address for Switch Network 30. A Switch Network usually uses a destination address to define which switch tap or node the Switch Network is to make a connection to. For instance, if Bus 500 is trying to connect to Bus 501, the switch destination address will cause a temporary switch connection to be formed between Bus 500 and Bus 501 for the duration of the communication. For instance, using the MI Option addressing scheme described herein, block 540 would use the (Adapter Address) high order 16-bits of Bus 550 to determine whether or not the address was within the supported range, and the Destination MI Field (the next 9 highest order bits) to define the switch destination address—which switch node to connect to. One of the allowable bit combinations of the 512 allowable selections is the Switch Network destination for connecting to Bus 501. Block 530 strips out the destination address from Bus 550 and presents it in sections as a byte destination address to block 534. In turn, block 534 sends the destination address over switch interface 900 (FIG. 11). Switch Network 30 receives the destination address and forms the requested connection, in this case to Network Adapter 131 which in turn connects to Bus 501. Block 530 then transfers the 32-bit address word which it received from Bus 550, as four byte-wide sections to block 534 and then across the established network connection to Network Adapter 131. The Switch Network 30 uses the destination address internally, but does not pass it across the network; the first information to be transmitted across the network is the 32-bit address field. On the other side of Network 30, Block 544 receives information as it comes from the Switch Network 30, and routes the first four bytes to Block 540 which reassembles the 4 bytes back into a 32-bit address. Block 540 uses the low order 7 bits of the reassembled address to access a look-up table, which is internal to block 540 and which has been preloaded. The look-up table provides a converted 32-bit bus address which block 540 sends to bus 550A to address the desired I/O tap or memory location on Bus 501. The number of bits used for the table look-up function can be variable. While block 540 is performing the address conversion function in Network Adapter 131, block 532 in Network Adapter 130 is receiving data from the section of Bus 500 labelled 552, which carries data. Block 532 receives the data and segments it into byte-wide pieces which it passes to block 534. Block 534 in turn, after the destination and full 4 address bytes have been transmitted to the Switch Network 30, changes to receiving data from block 532, and transmits byte-wide data to the Switch Network. Network Adapter 131 then begins receiving data from Switch network 30 into block 544. Block 544 after sending the first four bytes to block 540, then changes and sends the subsequent bytes to block 542. Block 542 reassembles the byte-wide data into 32-bit data words and places them on Bus 552A which is the data bus portion of Bus 501. The I/O device targeted on Bus 501, senses an address within its range and then receives the subsequent data. Data transfer continues until block 532 in Network Adapter 130 senses an end to the transfer. The end indication is transferred through Switch Network 30 as a special control line, which is interpreted by block 542, which in turn issues an end indication to Bus 501. The switch-based system of FIG. 13, for example is capable of transferring data in either direction.

Figure 14:
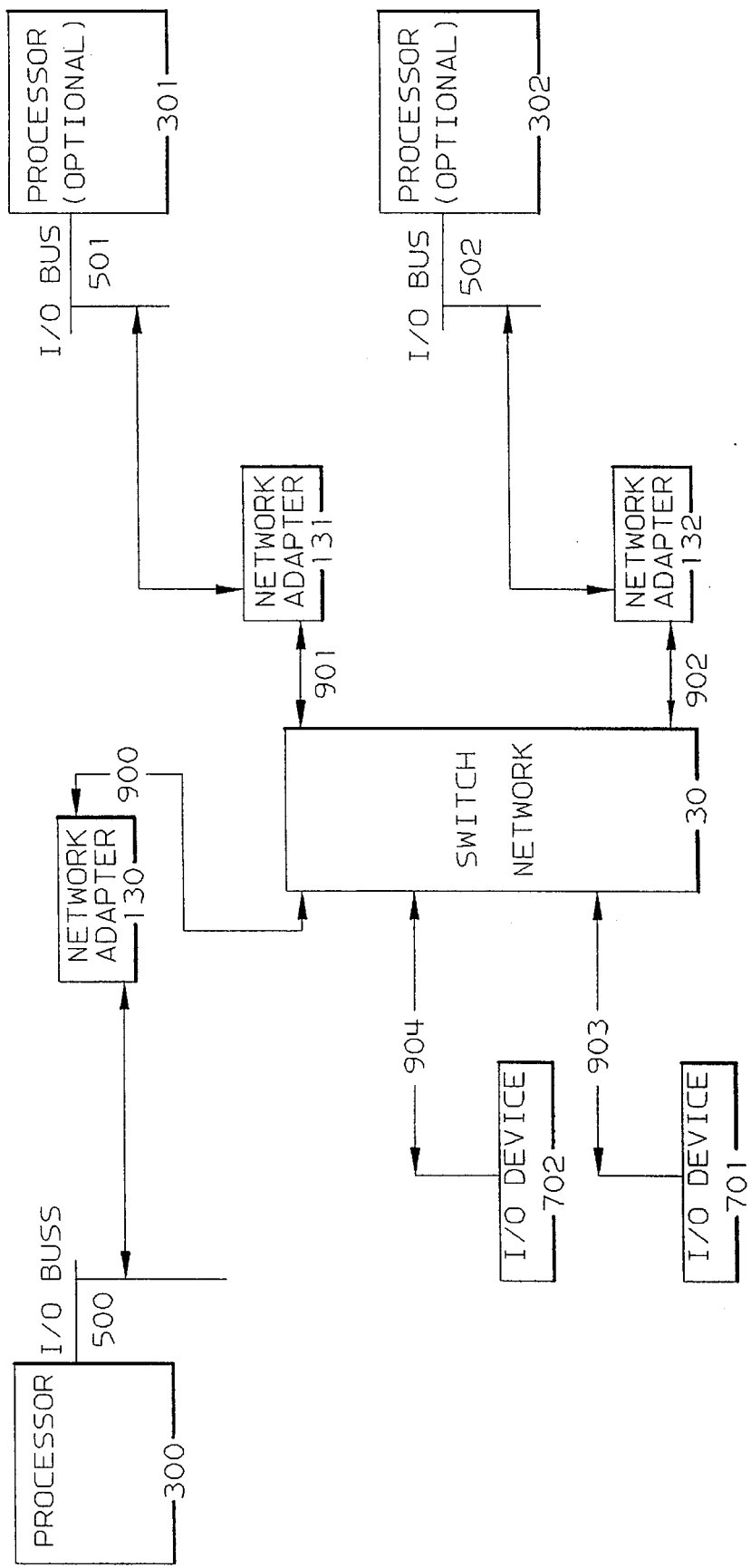
FIG. 14 illustrates generally an alternative embodiment of the system.

Referring to FIG. 14, in connection with FIGS. 1 and 9, the flexibility of the switch-based system is shown. For better performance the multi-drop bus can be eliminated entirely. The processors 30n can still supply an I/O bus 50n using their native bus architecture; however, the bus is limited to a single I/O Device—that being Network Adapter 13n. The Bus 50n itself then becomes a point-to-point connection capable of higher performance. Each processor can still connect as described above to unlimited I/O Devices, such as 701 and 702, and/or other Network Adapters having processors, such as 131 and 132. The same Network Adapter is used as shown in FIG. 13, the only difference is that the system becomes more parallel in nature and achieves better performance. The performance gain is two-fold: more parallel operation and better processor bus performance based on its restricted use.

It will be appreciated that, although specific embodiments of the invention have been described herein for purposes of illustration, various modifications may be made without departing from the spirit and scope of the invention. Clearly, the inventions which we have described by way of example and in illustration of our best mode of practicing the inventions in the various embodiments described provide a basis for much potential growth. Accordingly, it will be understood that those skilled in the art, both now and in the future, will envision further improvements even by way of invention, and these should be understood to be within the claimed scope which should be construed to protect and preserve the rights of the inventors. The scope of protection of this invention is limited only by the following claims and their equivalents.

We claim:

1. An apparatus for interconnecting computer systems, the apparatus comprising:

a plurality of parallel computer system buses, including a first system node bus and a second system node bus;

a switch network interconnecting said first and second system system node buses for establishing a direct, node to node communication path; and a plurality of network adapters, each said network adapter connected to said switch network and to at least one of said computer system buses, including:

means responsive to a bus sequence message including destination address and data on said first system node bus for determining if said destination address is for a device not on said first system node bus and, if not, for transmitting said bus sequence message to said switch network; and means responsive to said destination address for converting said destination address into a switch connection control code for routing said bus sequence message through said switch network and for appending said switch connection control code to said bus sequence message; and said switch network being responsive to said switch connection control code for establishing a direct port to port circuit connection to said second system node bus, stripping said switch connection control code from said message and transmitting said bus sequence message to said second system node bus.

2. The apparatus according to claim 1 wherein each of the parallel computer system buses includes a plurality of taps for connecting one or more computer system devices to said each of the parallel computer system buses, and for each of the computer system devices to communicate to another computer system device connected to the same parallel computer system bus via said same computer system bus, or to another computer system device connected to another parallel computer system bus via said same parallel computer system bus, the network adapter, and the switch network.

3. The apparatus according to claim 2 wherein the computer system devices include memory.

4. The apparatus according to claim 1, further comprising means for routing said message including unmodified address and data portions to said second system node bus.

5. The apparatus according to claim 1, further comprising look-up table means for routing said message to a device attached to said second system node bus.

6. An apparatus for increasing the capacity of a bus architecture by interconnecting a plurality of parallel buses over a multi-stage switch network, the apparatus comprising:

a multi-stage switch network for communicating messages having an address portion and a data portion;

sending adapter means connected to a first parallel bus responsive to said address portion for deriving an outgoing network address for routing said message through said multi-stage switch network to a destination bus, and for transmitting said outgoing network address and message to said multi-stage switch network; and receiving adapter means connected to said multi-stage switch network and to a second parallel bus for receiving said message and, responsive to said address portion, for routing said message to one of a plurality of devices connected to said second parallel bus.

7. The apparatus according to claim 6, wherein the plurality of buses includes three or more buses, and the switch means includes accessing means responsive to said outgoing network address for interconnecting any two of the buses, wherein data transmitted between said any two of the buses does not traverse another bus.

8. The apparatus according to claim 6, wherein the adapter means includes means responsive to said outgoing network address for programmable selection of a plurality of address conversion methods including direct, combinational logic, and table look-up to identify for a subset of said network addresses to which said adapter means is responsive a corresponding switch connection for the duration of communication.

9. A method for establishing a high-speed communications path through a switch network interconnecting a plurality of high performance parallel buses over a multi-stage switch network, comprising the steps of:

operating a first system node to load onto a first bus a communication message, said communication message including a destination port address and data;

operating an adapter connected to said first bus to recognize and translate a predetermined destination port address into a switching path address;

responsive to said switching path address, establishing a node to node communication link and communicating said communication message to said destination port; and responsive to said destination port address, operating an adapter connected to a second bus at said destination port to route said data to a device connected to said second bus.

10. The method of claim 9 wherein said switching path comprises a plurality of stages, and said switching path address includes for each stage a stage switch portion, further comprising the step of:

responsive to said switching path address, striping one stage switch portion from said switching path address at each stage.

11. The method of claim 10 wherein each said stage switch portion includes a path selection field and a dead field, and further comprising the step of:

detecting switch path contention during clocking of said dead field; and upon detecting switch path contention, issuing a reject signal to said adapter.

12. Apparatus for attaching a high performance parallel system bus to a multi-stage switch having M stages, comprising:

a first tap adaptable to receive from said system bus a multi-bit message including an address portion and a data portion;

a first address converter for generating from said address portion a stripable routing control code having M code portions; and a second tap adaptable to load to said switch said stripable routing control code together with said multi-bit message.

13. The apparatus of claim 12, further comprising:

a third tap adaptable to receive from said multi-stage switch said multi-bit message, exclusive of said routing control code; and a fourth tap adaptable to load said multi-bit message to said system bus.

14. The apparatus of claim 13, further comprising:

a second address converter for generating from said address portion a second routing code representative of a specific port on said system bus for output at said fourth tap.

* * * * *